United States Patent
Kitamura et al.

(10) Patent No.: US 6,919,712 B1
(45) Date of Patent: Jul. 19, 2005

(54) EXCITATION CONTROL DEVICE AND EXCITATION CONTROL METHOD

(75) Inventors: Hitomi Kitamura, Tokyo (JP); Masaru Shimomura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 184 days.

(21) Appl. No.: 10/030,986

(22) PCT Filed: Jun. 19, 2000

(86) PCT No.: PCT/JP00/03994
§ 371 (c)(1),
(2), (4) Date: Jan. 16, 2002

(87) PCT Pub. No.: WO01/99268
PCT Pub. Date: Dec. 27, 2001

(51) Int. Cl.[7] ............ H02P 9/00; H02P 9/10; H02P 9/14; H02H 7/06
(52) U.S. Cl. ............ 322/59; 322/19; 322/20; 322/21; 322/25; 322/28
(58) Field of Search ............ 322/17–37, 44–45, 322/47, 59, 61

(56) References Cited

U.S. PATENT DOCUMENTS

| | | | | |
|---|---|---|---|---|
| 2,213,945 A | * | 9/1940 | Alexanderson | 307/21 |
| 2,454,582 A | * | 11/1948 | Thompson et al. | 322/25 |
| 3,474,323 A | * | 10/1969 | Kilgore et al. | 322/25 |
| 3,562,545 A | * | 2/1971 | Rubner et al. | 307/87 |
| 3,619,761 A | * | 11/1971 | Nagae et al. | 322/25 |
| 3,621,369 A | * | 11/1971 | Masaomi et al. | 322/19 |
| 3,634,750 A | * | 1/1972 | Bobo | 322/20 |
| 3,656,048 A | * | 4/1972 | Hauf | 322/19 |
| 3,705,331 A | * | 12/1972 | South et al. | 361/20 |
| 3,794,846 A | * | 2/1974 | Schlicher et al. | 307/87 |
| 3,818,317 A | * | 6/1974 | Isono et al. | 322/21 |
| 3,899,731 A | * | 8/1975 | Smith | 322/25 |
| 3,936,727 A | * | 2/1976 | Kelley, et al. | 323/210 |
| 3,957,646 A | * | 5/1976 | Wickert | 210/242.3 |
| 3,963,978 A | * | 6/1976 | Kelley, et al. | 323/210 |
| 3,999,117 A | * | 12/1976 | Gyugyi et al. | 323/211 |
| 4,085,338 A | * | 4/1978 | Genrikh et al. | 307/147 |
| 4,219,769 A | * | 8/1980 | Macfarlane et al. | 322/28 |
| 4,264,856 A | * | 4/1981 | Friedrich et al. | 322/25 |
| 4,291,264 A | * | 9/1981 | Siemon | 318/729 |
| 4,322,630 A | | 3/1982 | Mezera et al. | 290/40 C |
| 4,344,025 A | * | 8/1982 | Okuyama et al. | 318/729 |
| 4,426,613 A | * | 1/1984 | Mizuno et al. | 322/21 |
| 4,590,416 A | * | 5/1986 | Porche et al. | 323/205 |
| 4,714,869 A | * | 12/1987 | Onitsuka | 322/20 |
| 4,743,832 A | * | 5/1988 | Brennen et al. | 323/211 |
| 4,767,976 A | * | 8/1988 | Mutoh et al. | 318/808 |
| 4,780,660 A | * | 10/1988 | Shima et al. | 323/207 |
| 4,920,277 A | * | 4/1990 | Kuwabara et al. | 290/40 C |
| 5,270,913 A | * | 12/1993 | Limpaecher | 363/140 |
| 5,357,419 A | * | 10/1994 | Limpaecher | 363/140 |

(Continued)

FOREIGN PATENT DOCUMENTS

| | | |
|---|---|---|
| JP | 4-79798 | 3/1992 |
| JP | 6-121598 | 4/1994 |
| JP | 6-315300 | 11/1994 |
| JP | 10-210795 | 8/1998 |

*Primary Examiner*—Darren Schuberg
*Assistant Examiner*—Pedro J. Cuevas
(74) *Attorney, Agent, or Firm*—Leydig, Voit & Mayer, Ltd.

(57) ABSTRACT

A reference voltage of an output terminal of a synchronous machine is set according to a reactive current output from the synchronous machine, a reference voltage of the high voltage side of a transformer, and a phase compensation transfer function to quicken attenuation of an electric power fluctuation.

4 Claims, 7 Drawing Sheets

U.S. PATENT DOCUMENTS

| | | | | |
|---|---|---|---|---|
| 5,440,222 A | * | 8/1995 | Tanaka et al. | 322/25 |
| 5,485,075 A | * | 1/1996 | Mori et al. | 323/207 |
| 5,537,307 A | * | 7/1996 | Hirose et al. | 363/79 |
| 5,561,597 A | * | 10/1996 | Limpaecher | 363/59 |
| 5,604,420 A | * | 2/1997 | Nambu | 322/19 |
| 5,642,000 A | * | 6/1997 | Jean-Jumeau et al. | 307/31 |
| 5,764,501 A | * | 6/1998 | Limpaecher | 363/61 |
| 5,907,483 A | * | 5/1999 | Iio et al. | 363/58 |
| 5,977,731 A | * | 11/1999 | Xia et al. | 318/147 |
| 6,218,813 B1 | * | 4/2001 | Davis | 322/20 |
| 6,265,852 B1 | | 7/2001 | Kitamura et al. | 322/59 |
| 6,323,618 B1 | | 11/2001 | Kitamura et al. | 318/700 |
| 6,339,316 B1 | * | 1/2002 | Eguchi et al. | 322/59 |
| 6,465,979 B1 | * | 10/2002 | Leijon et al. | 318/438 |
| 6,628,103 B2 | * | 9/2003 | Sumiya et al. | 322/20 |
| 6,762,592 B2 | * | 7/2004 | Noguchi et al. | 322/28 |
| 6,806,688 B2 | * | 10/2004 | Noro et al. | 322/20 |
| 6,847,184 B2 | * | 1/2005 | Noguchi et al. | 318/700 |
| 6,850,031 B2 | * | 2/2005 | Nakata et al. | 318/801 |
| 6,856,497 B2 | * | 2/2005 | Suzui et al. | 361/42 |

* cited by examiner

EXCITATION CONTROL DEVICE AND EXCITATION CONTROL METHOD

TECHNICAL FIELD

The present invention relates to an excitation control device and an excitation control method used for both the stabilization of voltage in an electric power system and the improvement of steady-state stability in the electric power system.

BACKGROUND ART

FIG. 1 is constitutional view of a conventional excitation control device. In FIG. 1, 1 indicates a synchronous machine. 2 indicates a transformer. 3 indicates a circuit breaker. 4 indicates a power transmission line. 5 indicates a power transmission bus line. 6 indicates a potential transformer (hereinafter, called PT) for detecting a voltage $V_G$ of an output terminal of the synchronous machine 1. 7 indicates a current transformer (hereinafter, called CT) for detecting a reactive current $I_Q$ output from the synchronous machine 1. 8 indicates a voltage setting device for setting a reference voltage $V_{Gref}$ of the output terminal of the synchronous machine 1 according to both the reactive current $I_Q$ detected in the CT 7 and a reference voltage $V_{Href}$ of the high voltage side of the transformer 2.

9 indicates a subtracting unit for subtracting the output terminal voltage $V_G$ detected in the PT 6 from the reference voltage $V_{Gref}$ set in the voltage setting device 8 to obtain a subtraction value and outputting a difference signal indicating the subtraction value. 10 indicates an automatic voltage regulating device (hereinafter, called AVR) for controlling a commutation timing of an exciter 11 by using the difference signal output from the subtracting unit 9 as an input condition for a transfer function. 11 indicates the exciter for supplying a field current to a field winding 12 of the synchronous machine 1 according to an instruction of the AVR 10. 12 indicates the field winding of the synchronous machine 1.

FIG. 2 is a flow chart showing a conventional excitation control method.

Next, an operation will be described.

A voltage $V_G$ of the output terminal of the synchronous machine 1 is detected in the PT 6 (step ST1), and a reactive current $I_Q$ output from the synchronous machine 1 is detected in the CT 7 and the PT 6 (step ST2).

When the reactive current $I_Q$ is detected in the CT 7, a reference voltage $V_{Gref}$ of the output terminal of the synchronous machine 1 is set in the voltage setting device 8 according to both the reactive current $I_Q$ and a reference voltage $V_{Href}$ of the high voltage side of the transformer 2 (step ST3).

Hereinafter, a setting method of the reference voltage $V_{Gref}$ is described.

A relation between the voltage $V_G$ of the output terminal of the synchronous machine 1 and a voltage $V_H$ of the high voltage side of the transformer 2 is expressed according to an equation (1).

$$V_G = V_H + X_t \times I_Q \tag{1}$$

Here, the symbol $X_t$ in the equation (1) denotes a reactance of the transformer 2.

Also, as shown in FIG. 3, in cases where a plurality of synchronous machines 1 are connected to a power transmission system, reactance of each synchronous machine 1 with another synchronous machine 1 is equal to almost zero by applying the equation (1) as a relation between the reference voltage $V_{Gref}$ and the reference voltage $V_{Href}$, a cross current flows from one synchronous machine 1 to another synchronous machine 1 due to both a voltage difference of the output terminal voltages $V_G$ and a response difference in each synchronous machine 1 with another synchronous machine 1, and each synchronous machine 1 has an excessive load. To suppress the generation of the cross current, as is expressed according to an equation (2), a reactance $X_{DR}$ corresponding to the suppression of the cross current is subtracted from the reactance $X_t$ of the transformer 2. Here, the reactance $X_{DR}$ corresponding to the suppression of the cross current is set to a value equal to several % of the reactance $X_t$ of the transformer 2, and the value of the reactance $X_{DR}$ is empirically set.

$$V_{Gref} = V_{Href} + (X_t - X_{DR}) \times I_Q \tag{2}$$

Therefore, the reference voltage $V_{Gref}$ of the output terminal of the synchronous machine 1 is calculated in the voltage setting device 8 by substituting the reactive current $I_Q$ output from the synchronous machine 1 and the reference voltage $V_{Href}$ of the high voltage side of the transformer 2 into the equation (2).

When the reference voltage $V_{Gref}$ of the output terminal of the synchronous machine 1 is set in the voltage setting device 8, the voltage $V_G$ of the output terminal of the synchronous machine 1 detected in the PT 6 is subtracted in the subtracting unit 9 from the reference voltage $V_{Gref}$ set in the voltage setting device 8 to obtain a subtraction value, and a difference signal indicating the subtraction value is output (step ST4).

When the difference signal is output from the subtracting unit 9, a timing signal for controlling a commutation timing of the exciter 11 is produced in the AVR 10, for example, by using the difference signal as an input condition for a following transfer function (step ST5).

$$\text{Transfer Function} = K \times (1 + T_{LD} \times s)/(1 + T_{LG} \times s) \tag{3}$$

Here, the symbol K denotes a gain constant, the symbols $T_{LD}$ and $T_{LG}$ denote time constants, and the symbol s denotes a Laplace operator.

When the timing signal output from the AVR 10 is received in the exciter 11, a field current is supplied to the field winding 12 of the synchronous machine 1 according to the timing signal (step ST6). Here, when the difference signal output from the subtracting unit 9 is equal to a positive value, the field current supplied to the field winding 12 is increased, and the voltage $V_G$ of the output terminal of the synchronous machine 1 is heightened. In contrast, when the difference signal output from the subtracting unit 9 is equal to a negative value, the field current supplied to the field winding 12 is decreased, and the voltage $V_G$ of the output terminal of the synchronous machine 1 is lowered.

Therefore, the voltage $V_G$ of the output terminal of the synchronous machine 1 is controlled so as to agree with the reference voltage $V_{Gref}$. Also, when the reactive current $I_Q$ output from the synchronous machine 1 is equal to zero, the voltage $V_H$ of the high voltage side of the transformer 2 is controlled so as to agree with the reference voltage $V_{Href}$.

$$V_G = V_{Href} + (X_t - X_{DR}) \times I_Q \tag{4}$$

$$V_H = V_{Href} - X_{DR} \times I_Q \tag{5}$$

Therefore, because the voltage of the power transmission bus line 5 is maintained to a constant value, even though a failure occurs, for example, in the power transmission line 4, the lowering of the voltage in the whole power transmission system can be lessened.

Because the conventional excitation control device has the above-described configuration, even though a failure occurs in the power transmission line 4, the lowering of the voltage in the whole power transmission system can be lessened. However, because no means for quickening the attenuation of an electric power fluctuation of power transmission system occurring due to a failure of the power transmission system is arranged in the conventional excitation control device, a problem has arisen that it is required to additionally arrange a power system stabilization control device (PSS) for the purpose of quickening the attenuation of an electric power fluctuation.

The present invention is provided to solve the above-described problem, and the object of the present invention is to provide an excitation control device and an excitation control method in which the attenuation of an electric power fluctuation is quickened while controlling a voltage of the high voltage side of a transformer to a constant value.

DISCLOSURE OF THE INVENTION

An excitation control device of the present invention comprises a voltage setting means for setting a reference voltage of an output terminal of a synchronous machine according to a reactive current detected by a reactive current detecting means, a reference voltage of an output side of a transformer and a function of phase compensation used to quicken the attenuation of an electric power fluctuation.

Therefore, a voltage on the output side of the transformer can be set to a constant value, and the attenuation of the electric power fluctuation can be quickened.

In the excitation control device of the present invention, the reference voltage of the output terminal of the synchronous machine is set by the voltage setting means by considering the voltage of the output terminal of the synchronous machine detected by the voltage detecting means.

Therefore, the attenuation of the electric power fluctuation can be adjusted to a desired speed.

An excitation control method of the present invention comprises the step of setting a reference voltage of an output terminal of a synchronous machine according to a reactive current output from the synchronous machine, a reference voltage of an output side of a transformer and a function of phase compensation used to quicken the attenuation of an electric power fluctuation.

Therefore, a voltage on the output side of the transformer can be set to a constant value, and the attenuation of the electric power fluctuation can be quickened.

In the excitation control method of the present invention, the reference voltage of the output terminal of the synchronous machine is set by considering the voltage of the output terminal of the synchronous machine.

Therefore, the attenuation of the electric power fluctuation can be adjusted to a desired speed.

BEST MODE FOR CARRYING OUT THE INVENTION

Hereinafter, the best mode for carrying out the present invention will now be described with reference to the accompanying drawings to explain the present invention in more detail.

Embodiment 1

Figure 1:
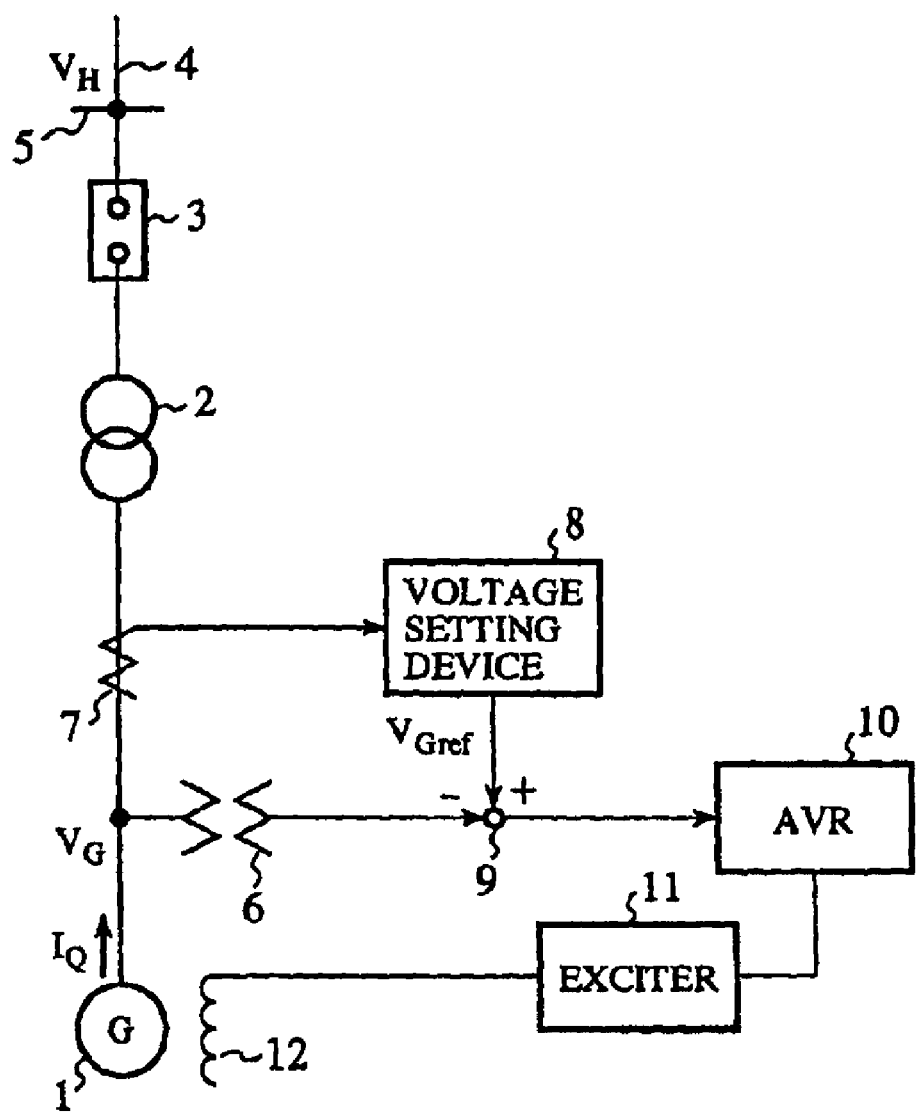
FIG. 1 is constitutional view of a conventional excitation control device.
Figure 2:
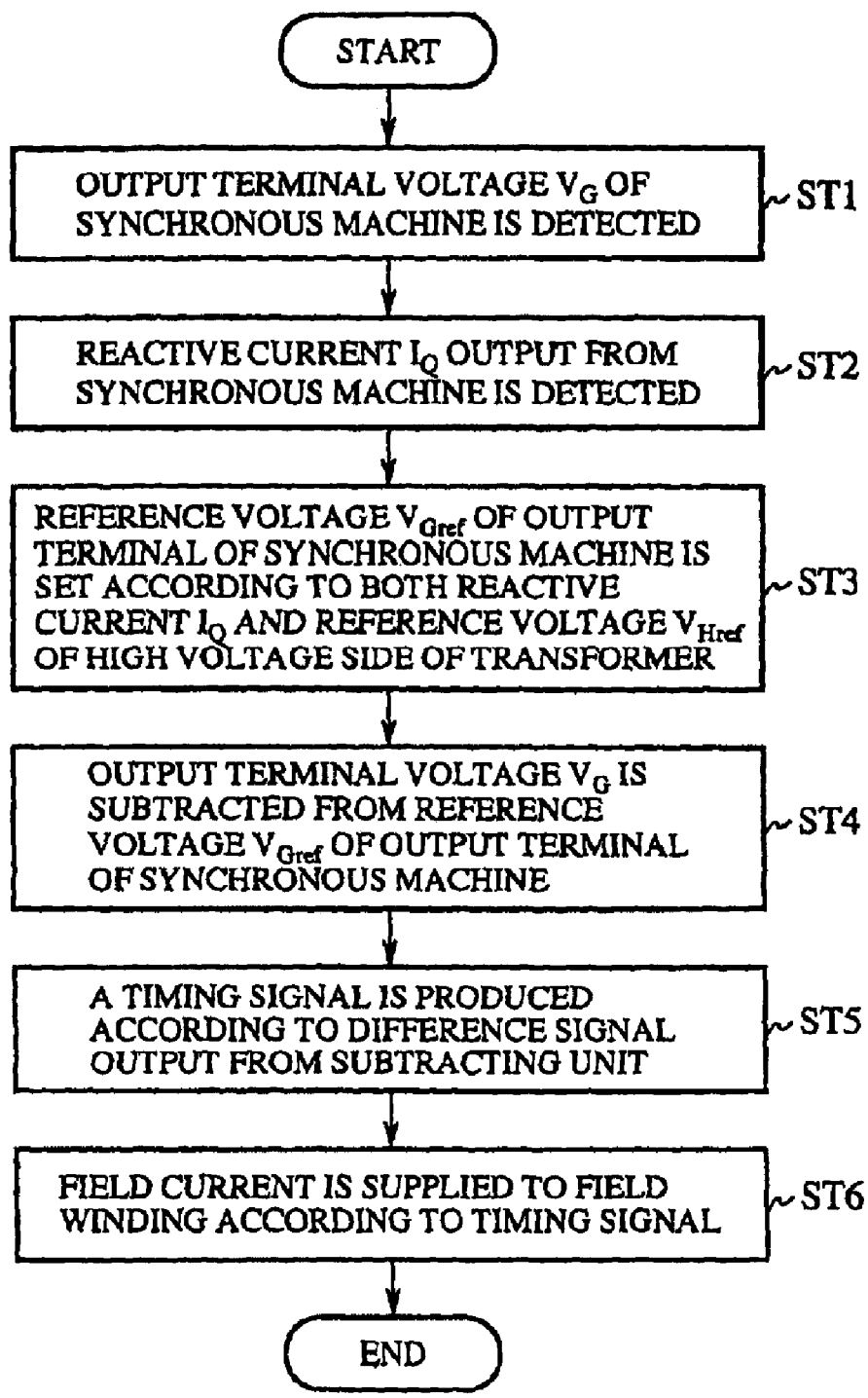
FIG. 2 is a flow chart showing a conventional excitation control method.
Figure 3:
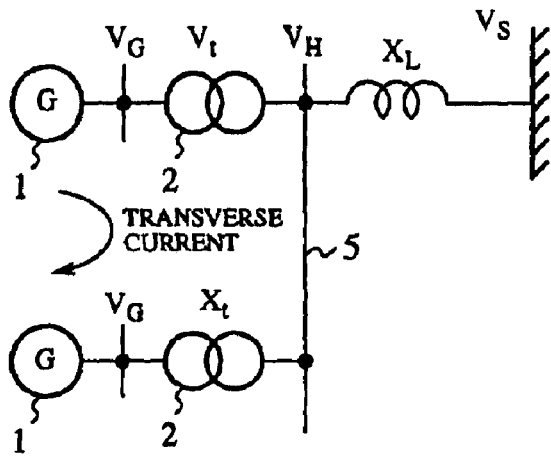
FIG. 3 is a system view showing an infinite bus line model.
Figure 4:
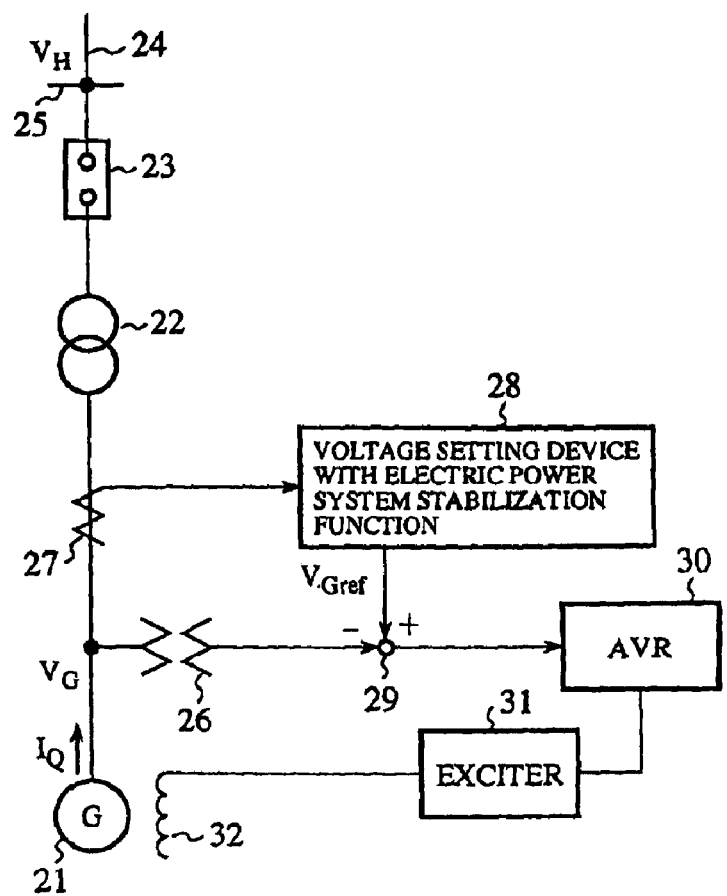
FIG. 4 is constitutional view of an excitation control device according to a first embodiment of the present invention.

FIG. 4 is constitutional view of an excitation control device according to a first embodiment of the present invention. In FIG. 4, 21 indicates a synchronous machine. 22 indicates a transformer. 23 indicates a circuit breaker. 24 indicates a power transmission line. 25 indicates a power transmission bus line of a power plant. 26 indicates a PT (or a voltage detecting means), denoting a potential transformer, for detecting a voltage $V_G$ of an output terminal of the synchronous machine 21. 27 indicates a CT (or a reactive current detecting means), denoting a current transformer, for detecting a reactive current $I_Q$ output from the synchronous machine 21. 28 indicates a voltage setting device with electric power system stabilization function (or a voltage setting means) for setting a reference voltage $V_{Gref}$ of the output terminal of the synchronous machine 21 according to the reactive current $I_Q$ detected in the CT 27, a reference voltage $V_{Href}$ of the high voltage side of the transformer 22 and a transfer function $F_{H1}(s)$ of phase compensation used to quicken the attenuation of an electric power fluctuation of a power transmission system.

29 indicates a subtracting unit for subtracting the output terminal voltage $V_G$ detected in the PT 26 from the reference voltage $V_{Gref}$ set in the voltage setting device with electric power system stabilization function 28 to produce a subtraction value and outputting a difference signal indicating the subtraction value. 30 indicates an AVR, denoting an automatic voltage regulating device, for controlling a commutation timing of an exciter 31 by using the difference signal output from the subtracting unit 29 as an input condition for a transfer function of commutation timing. 31 indicates the exciter for supplying a field current to a field winding 32 of the synchronous machine 21 according to an instruction of the AVR 30. 32 indicates the field winding of the synchronous machine 21. Here, control means comprises the subtracting unit 29, the AVR 30 and the exciter 31.

Figure 5:
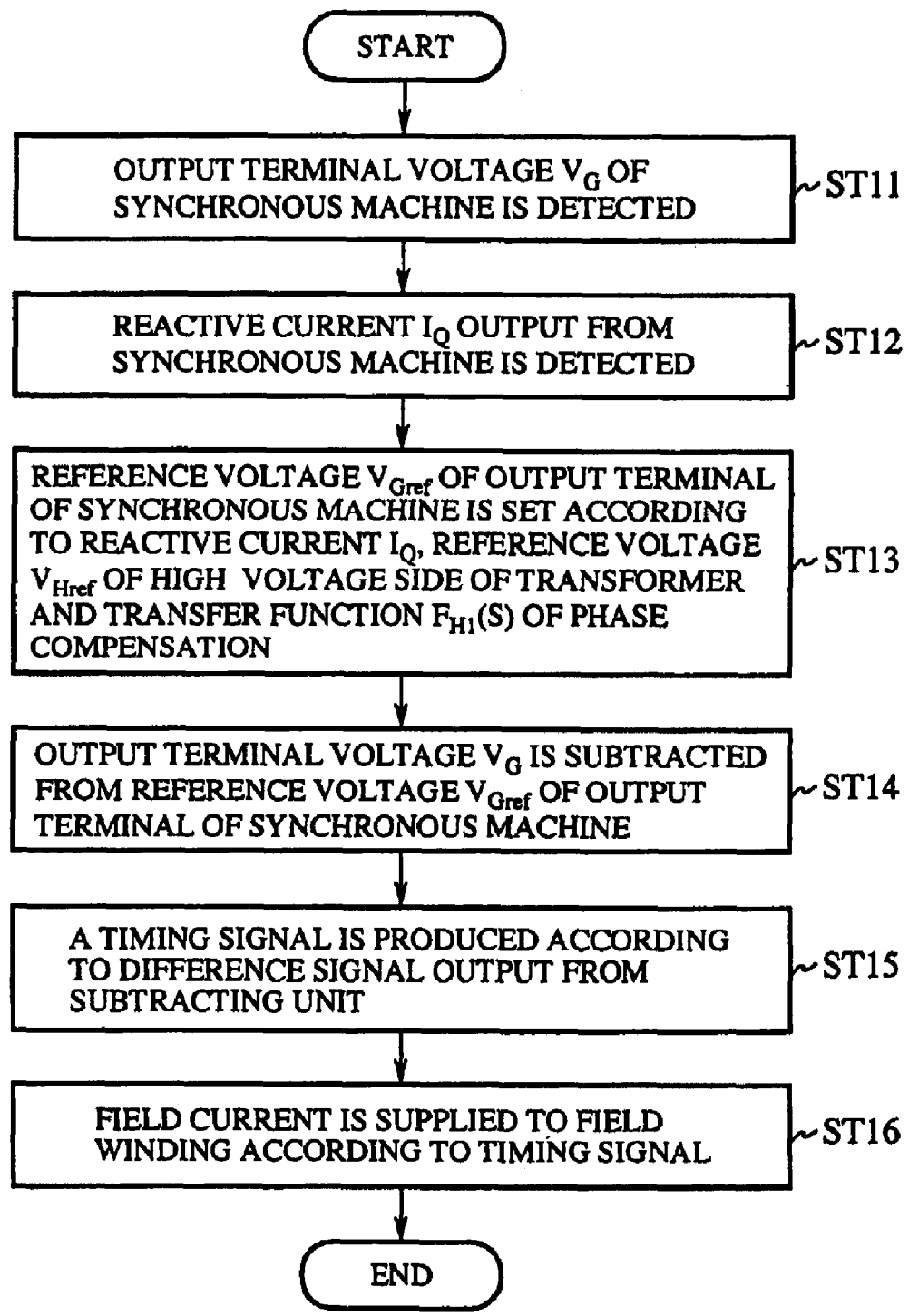
FIG. 5 is a flow chart showing an excitation control method according to the first embodiment of the present invention.
Figure 6:
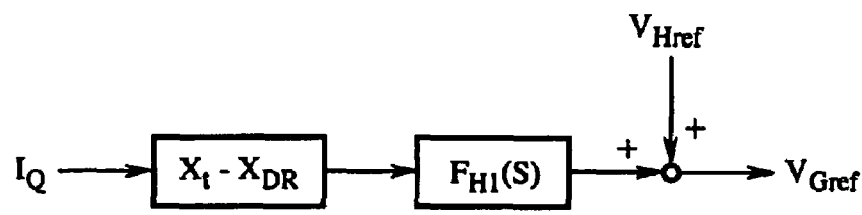
FIG. 6 is an explanatory view showing an internal configuration of a voltage setting device with electric power system stabilization function.

FIG. 5 is a flow chart showing an excitation control method according to a first embodiment of the present invention, and FIG. 6 is an explanatory view showing an internal configuration of the voltage setting device with electric power system stabilization function 28.

Next an operation will be described below.

A voltage $V_G$ of the output terminal of the synchronous machine 21 is detected in the PT 26 (step ST11), and a reactive current $I_Q$ output from the synchronous machine 21 is detected in the CT 27 (step ST12).

When the reactive current $I_Q$ is detected in the CT 27, a reference voltage $V_{Gref}$ of the output terminal of the synchronous machine 21 is set in the voltage setting device with electric power system stabilization function 28 according to the reactive current $I_Q$, a reference voltage $V_{Href}$ of the high voltage side of the transformer 22 and a transfer function $F_{H1}(s)$ of phase compensation used to quicken the attenuation of an electric power fluctuation (step ST13). In detail, the reference voltage $V_{Gref}$ of the output terminal of the synchronous machine 21 is calculated by substituting the reactive current $I_Q$, the reference voltage $V_{Href}$ and the transfer function $F_{H1}(s)$ into the equation (6) (refer to FIG. 6).

$$V_{Gref}=V_{Href}+F_{H1}(s)\times(X_t-X_{DR})\times I_Q \qquad (6)$$

Here, the symbol $X_t$ in the equation (6) denotes a reactance of the transformer 22, and the symbol $X_{DR}$ denotes a reactance corresponding to the suppression of a crosscurrent flowing in cases where a plurality of synchronous machines 21 are connected to a power transmission line. Also, $F_{H1}(s)$ denotes a transfer function in a phase compensation circuit in which a signal indicating a timing appropriate to quicken the attenuation of an electric power fluctuation is produced. For example, $F_{H1}(s)$ is set to a transfer function expressed according to an equation (7).

$$F_{H1}(s)=a_{1n}\times s^n+a_{1(n-1)}\times s^{n-1}+\cdots+a_{11}\times s+a_{10} \qquad (7)$$

wherein the symbol s denotes a Laplace operator, and the Symbols a denote constant values respectively.

Here, to make a voltage $V_H$ of the high voltage side of the transformer 22 agree with the reference voltage $V_{Href}$ in a normal operation, it is required to set each constant a of the equation (7) so as to set a gain of $F_{H1}(s)$ to 1 in the normal operation.

Thereafter, when the reference voltage $V_{Gref}$ of the output terminal of the synchronous machine 21 is set in the voltage setting device with electric power system stabilization function 28, the voltage $V_G$ of the output terminal of the synchronous machine 21 detected in the PT 26 is subtracted in the subtracting unit 29 from the reference voltage $V_{Gref}$ set in the voltage setting device with electric power system stabilization function 28 to obtain a subtraction value, and a difference signal indicating the subtraction value is output (step ST14).

Thereafter, a timing signal for controlling a commutation timing of the exciter 31 is produced in the AVR 30 when the difference signal output from the subtracting unit 29 is received as an input signal (step ST15).

Thereafter, when the timing signal output from the AVR 30 is received in the exciter 31, a field current is supplied from the exciter 31 to the field winding 32 of the synchronous machine 21 according to the timing signal (step ST16).

Here, when the difference signal output from the subtracting unit 29 is equal to a positive value, the field current supplied to the field winding 32 is increased, and the voltage $V_G$ of the output terminal of the synchronous machine 21 is heightened. In contrast, when the difference signal output from the subtracting unit 29 is equal to a negative value, the field current supplied to the field winding 32 is decreased, and the voltage $V_G$ of the output terminal of the synchronous machine 21 is lowered.

Therefore, the voltage $V_G$ of the output terminal of the synchronous machine 21 is controlled so as to agree with the reference voltage $V_{Gref}$.

Also, the voltage $V_G$ of the output terminal of the synchronous machine 21 has relation to the voltage $V_H$ of the high voltage side of the transformer 22 according to an equation (8). Therefore, the voltage $V_G$ of the output terminal of the synchronous machine 21 and the voltage $V_H$ of the high voltage side of the transformer 22 are expressed according to equations (9) and (10) respectively by using the reference voltage $V_{Href}$ of the high voltage side of the transformer 22.

$$V_H=V_G-X_t\times I_Q \qquad (8)$$

$$V_G=V_{Href}+(X_t-X_{DR})\times I_Q \qquad (9)$$

$$V_H=V_{Href}-X_{DR}\times I_Q \qquad (10)$$

Therefore, when the reactive current $I_Q$ output from the synchronous machine 21 is equal to zero, the voltage $V_H$ of the high voltage side of the transformer 22 can be controlled so as to agree with the reference voltage $V_{Href}$.

As is described above, in the first embodiment, the reference voltage $V_{Gref}$ of the output terminal of the synchronous machine 21 is set according to the reactive current $I_Q$ output from the synchronous machine 21, the reference voltage $V_{Href}$ of the high voltage side of the transformer 22 and the transfer function $F_{H1}(s)$ of phase compensation used to quicken the attenuation of an electric power fluctuation. Therefore, the voltage $V_H$ of the high voltage side of the transformer 22 can be controlled to a constant value. As a result, even though a failure occurs in the power transmission system or a load on the power transmission system is rapidly increased, the voltage $V_H$ of the high voltage side of the transformer 22 can be stabilized. Also, because the attenuation of an electric power fluctuation can be quickened, the steady-state stability in an electric power system can be heightened.

Embodiment 2

Figure 7:
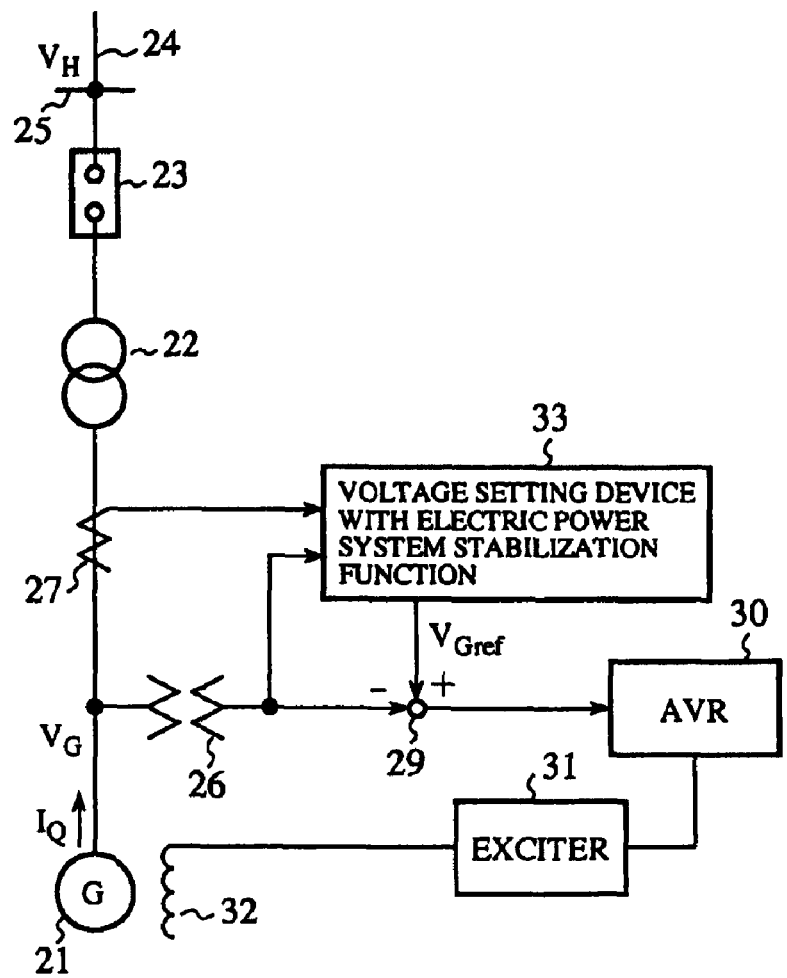
FIG. 7 is constitutional view of an excitation control device according to a second embodiment of the present invention.

FIG. 7 is constitutional view of an excitation control device according to a second embodiment of the present invention. The constituent elements, which are the same as those shown in FIG. 4, are indicated by the same reference numerals as those of the constituent elements shown in FIG. 4, and additional description of those constituent elements is omitted.

33 indicates a voltage setting device with electric power system stabilization function (or a voltage setting means) for setting a reference voltage $V_{Gref}$ of the output terminal of the synchronous machine 21 according to a reactive current $I_Q$ detected in the CT 27, an output terminal voltage $V_G$ detected in the PT 26, a reference voltage $V_{Href}$ of the high voltage side of the transformer 22 and a transfer function $F_{H2}(s)$ of phase compensation used to quicken the attenuation of an electric power fluctuation.

Figure 8:
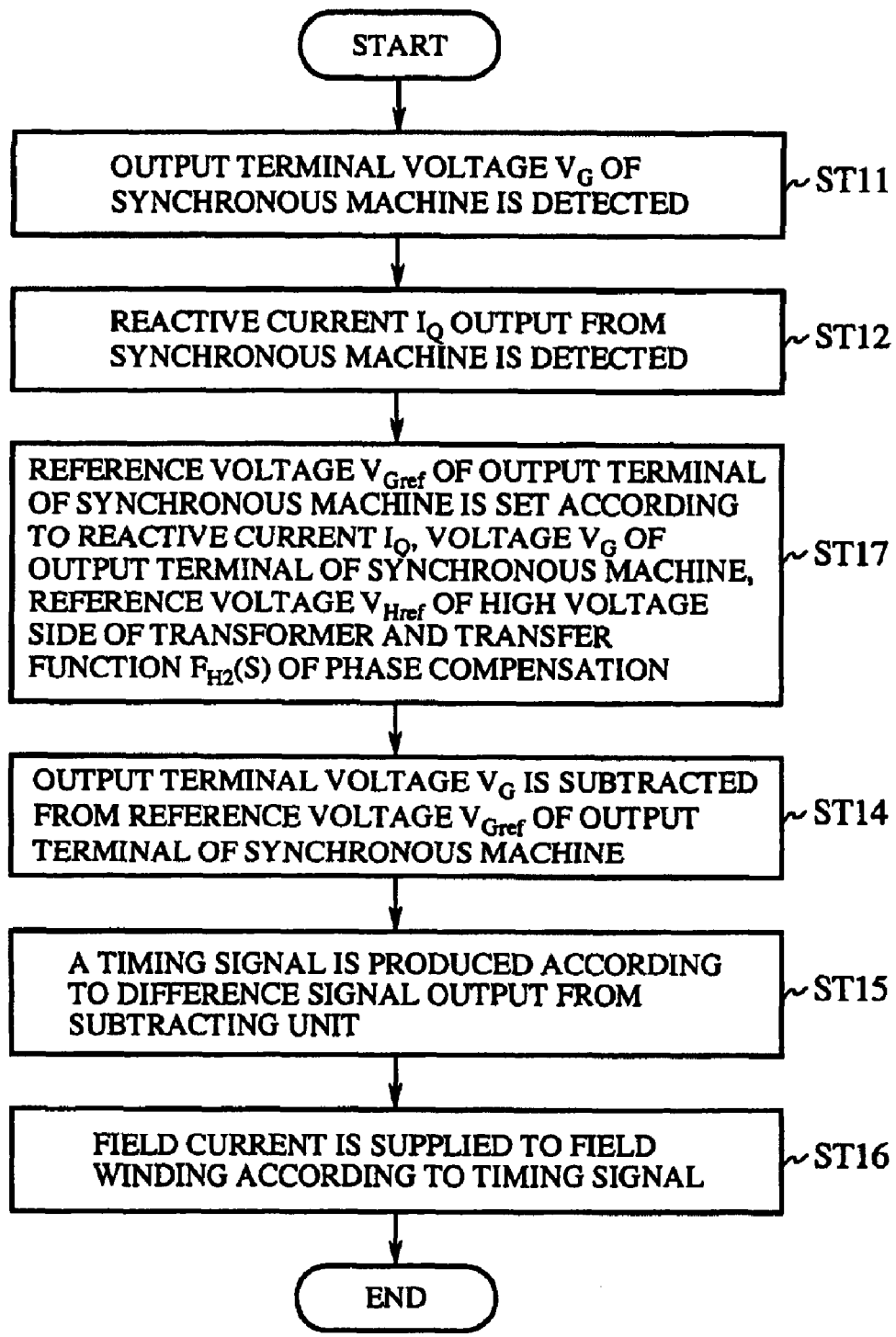
FIG. 8 is a flow chart showing an excitation control method according to the second embodiment of the present invention.
Figure 9:
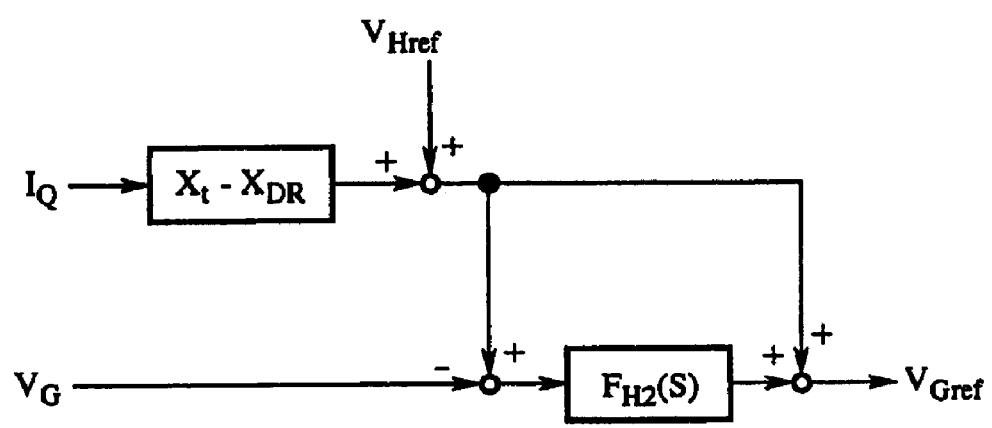
FIG. 9 is an explanatory view showing an internal configuration of a voltage setting device with electric power system stabilization function.

FIG. 8 is a flow chart showing an excitation control method according to the second embodiment of the present invention, FIG. 9 is an explanatory view showing an internal configuration of the voltage setting device with electric power system stabilization function 33.

Next an operation will be described below.

In the first embodiment, the reference voltage $V_{Gref}$ of the output terminal of the synchronous machine 21 is set according to the reactive current $I_Q$ output from the synchronous machine 21, the reference voltage $V_{Href}$ of the high voltage side of the transformer 22 and the transfer function $F_{H1}(s)$ of phase compensation used to quicken the attenuation of an electric power fluctuation. However, it is preferred that a reference voltage $V_{Gref}$ of the output terminal of the synchronous machine 21 is set by considering an output terminal voltage $V_G$ detected in the PT 26.

In detail, as shown in FIG. 9, a reference voltage $V_{Gref}$ of the output terminal of the synchronous machine 21 is set in the voltage setting device with electric power system stabilization function 33 according to a reactive current $I_Q$ detected in the CT 27, an output terminal voltage $V_G$ detected in the PT 26, a reference voltage $V_{Href}$ of the high voltage side of the transformer 22 and a transfer function $F_{H2}(s)$ of phase compensation used to quicken the attenuation of an electric power fluctuation (step ST17).

$$V_{Gref} = V_{Href} + (X_t - X_{DR}) \times I_Q + \{V_{Href} + (X_t - X_{DR}) \times I_Q - V_G\} \times F_{H2}(s) \quad (11)$$

Here, the symbol $X_t$ in the equation (11) denotes a reactance of the transformer 22, and the symbol $X_{DR}$ denotes a reactance corresponding to the suppression of a cross current flowing in cases where a plurality of synchronous machines 21 are connected to a power transmission line. Also, $F_{H2}(s)$ denotes a transfer function in a phase compensation circuit in which a signal indicating a timing appropriate to quicken the attenuation of an electric power fluctuation is produced. For example, $F_{H2}(s)$ is set to a transfer function expressed according to an equation (12).

$$F_{H2}(s) = a_{2n} \times s^n + a_{2(n-1)} \times s^{n-1} + \cdots + a_{21} \times s + a_{20} \quad (12)$$

wherein the symbol s denotes a Laplace operator, and the symbols a denote constant values respectively.

As is described above, in cases where the reference voltage $V_{Gref}$ of the output terminal of the synchronous machine 21 is calculated, even though the transfer function $F_{H2}(s)$ is set to any value, the voltage $V_H$ of the high voltage side of the transformer 22 agrees with the reference voltage $V_{Href}$ in a normal operation (because $V_{Href} + (X_t - X_{DR}) \times I_Q - V_G = 0$ is satisfied in the normal operation). Therefore, the excitation control device of the second embodiment differs from that of the first embodiment in that it is not required to set a gain of $F_{H1}(s)$ to 1 in the normal operation, and the attenuation of an electric power fluctuation can be adjusted to a desired speed.

INDUSTRIAL APPLICABILITY

As is described above, in cases where an exciting system of a synchronous machine is controlled, the excitation control device and the excitation control method according to the present invention is appropriate to perform the stabilization of voltage in an electric power system and the improvement of steady-state stability in the electric power system.

What is claimed is:

1. An excitation control device comprising:

voltage detecting means for detecting a voltage of an output terminal of a synchronous machine which is connected to a power transmission system through a transformer;

reactive current detecting means for detecting a reactive current output from the synchronous machine;

voltage setting means for setting a reference voltage of the output terminal of the synchronous machine according to the reactive current detected by the reactive current detecting means, a reference voltage of an output side of the transformer, and a phase compensation transfer function to quicken attenuation of an electric power fluctuation; and control means for controlling an exciting system of the synchronous machine according to a difference between the reference voltage set by the voltage setting means and the voltage of the output terminal of the synchronous machine detected by the voltage detecting means.

2. The excitation control device according to claim 1, wherein the reference voltage of the output terminal of the synchronous machine is set by the voltage setting means based on the voltage of the output terminal of the synchronous machine detected by the voltage detecting means.

3. An excitation control method, comprising:

detecting a voltage of an output terminal of a synchronous machine which is connected to a power transmission system through a transformer;

detecting a reactive current output from the synchronous machine;

setting a reference voltage of the output terminal of the synchronous machine according to the reactive current, a reference voltage of an output side of the transformer, and a phase compensation transfer function to quicken attenuation of an electric power fluctuation; and controlling an exciting system of the synchronous machine according to a difference between the reference voltage of the output terminal of the synchronous machine and the voltage of the output terminal of the synchronous machine.

4. The excitation control method according to claim 3, wherein setting the reference voltage of the output terminal of the synchronous machine includes setting the reference voltage of the output terminal of the synchronous machine based on the voltage of the output terminal of the synchronous machine.

* * * * *